(No Model.)
G. BOAS.
APPARATUS FOR APPLYING INSECTICIDES OR SIMILAR SUBSTANCES.
No. 514,253. Patented Feb. 6, 1894.
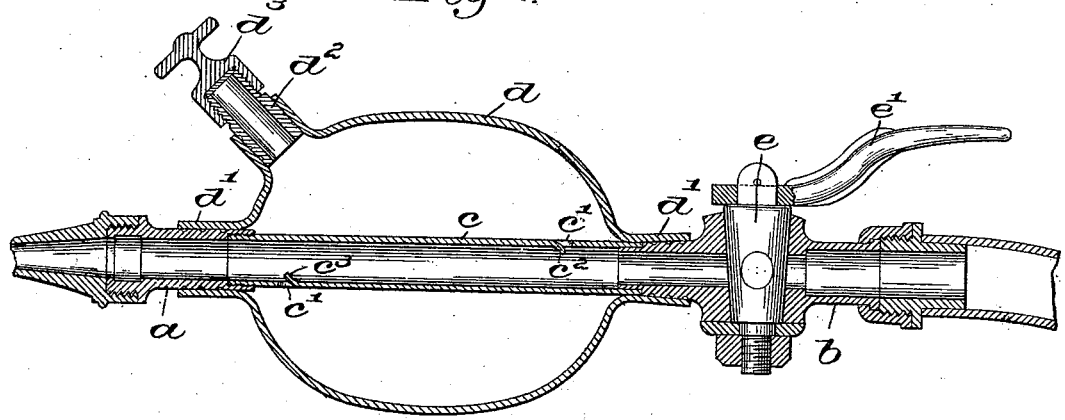
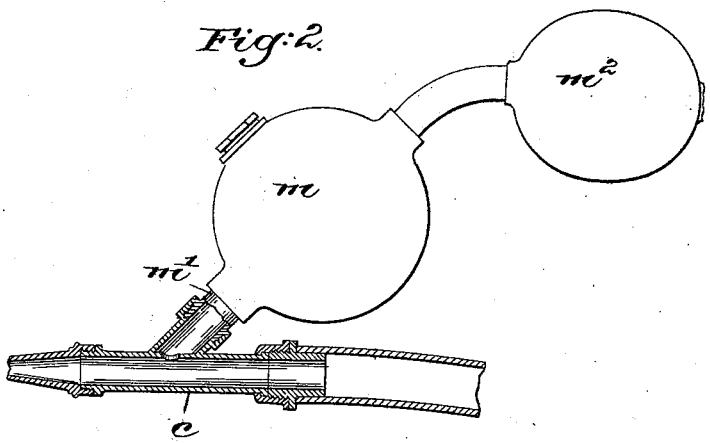
Witnesses.
Fred A. Grimbaf.
Louis N. Dowell
Inventor.
Gabriel Boas.
by Crosby & Gregory
Attys.

UNITED STATES PATENT OFFICE.

GABRIEL BOAS, OF BOSTON, MASSACHUSETTS.

APPARATUS FOR APPLYING INSECTICIDES OR SIMILAR SUBSTANCES.

SPECIFICATION forming part of Letters Patent No. 514,253, dated February 6, 1894.

Application filed April 3, 1893. Serial No. 468,840. (No model.)

*To all whom it may concern:*

Be it known that I, GABRIEL BOAS, of Boston, county of Suffolk, State of Massachusetts, have invented an Improvement in Apparatus for Applying Insecticides or Similar Substances, of which the following description, in connection with the accompanying drawings, is a specification, like letters on the drawings representing like parts.

This invention relates to apparatus for applying insecticide and similar substances to trees, shrubs, and the like, the principal object of the invention being to provide an apparatus which may be used like an ordinary garden hose and apply the insecticide or substance in the form of a spray and yet have the apparatus at all times completely under the control of the operator, whereby the quantity of the insecticide applied at any time or to any particular plant or shrub may be regulated as deemed necessary.

My invention consists in an apparatus in which an insecticide-containing reservoir is connected with a fluid conducting pipe, as for instance, an ordinary garden hose, and providing the apparatus with means for applying external pressure to the insecticide contained in the reservoir, whereby the insecticide normally retained in the reservoir by the pressure of the fluid in the conducting pipe may be forced into and mingle with the fluid in said conducting pipe, as will be more fully hereinafter set forth.

In the drawings, Figure 1, represents in longitudinal section one form of apparatus embodying this invention; and Fig. 2, a modification to be described.

I have herein shown and will describe my invention as constructed to be applied to and used in connection with the usual garden hose, and referring to the drawings, $a$ and $b$ represent two metallic heads, one of which, as $a$, is threaded to receive the usual garden spraying nozzle which may be of any desired shape or construction, while the head $b$ is interiorly threaded at its outer end to receive the nipple on the end of the garden hose, not shown. These two heads are connected by a tube $c$ so that a continuous pipe or passage leading from the hose to the nozzle is provided through the heads and the connecting tube. Surrounding the tube $c$ is a compressible bulb $d$, the necks $d'$ of which fit tightly about the necks of the heads $a$ and $b$, to thereby render the reservoir formed within and by the bulb $d$, air and fluid-tight. The bulb $d$ is provided with an inlet $d^2$ fitted with a screw cap $d^3$, through which opening a quantity of insecticide, deodorizing or other substance or fluid may be placed, the pipe $c$ within said bulb being provided with one or more perforations $c'$ through which the contents of the bulb $d$ may, by the application of external pressure, be forced into the conducting pipe $c$.

As herein shown and preferably the head $b$ is provided with a plug or valve $e$ controlled by a handle $e'$, by means of which the flow of fluid through the pipe $c$ may be controlled at will.

The operation of my improved apparatus is as follows:—The insecticide or deodorizing or other substance or material which it is desired to apply to the trees or shrubs is placed within the bulb $d$ which constitutes the reservoir, the cap $d^3$ applied to close the entrance opening. The head $b$ is then secured to the nipple on the end of the hose and the water turned on and permitted to flow through the pipe $c$ and issue at the nozzle, as in the ordinary garden hose, the pressure of the water within said pipe holding back the contents of the bulb and preventing said contents from mingling with the water passing through the pipe. When it is desired to apply any of the contents of the bulb to a tree or shrub, the bulb is compressed by the application of external pressure, which thereby forces more or less of the contents of the bulb through the perforations $c'$ into the pipe $c$ to mingle with the fluid flowing therethrough and to be sprayed therewith upon the tree or shrub toward which the nozzle is directed. According as the pressure applied to the bulb is greater or less so will the quantity of insecticide or deodorizing substance contained within the bulb be caused to mingle in greater or less quantities with the water flowing through the pipe.

In practice, the contents of the bulb or reservoir will preferably be colored somewhat in order that it may color the spray issuing from the nozzle, and thus enable the operator to determine at all times by the color of the spray, the quantity of insecticide or deodorizing substance which is being applied to the tree or shrub. When the pressure upon the bulb is relaxed the portion of the bulb not filled with the insecticide or deodorizing substance or fluid is immediately filled with water or fluid from the pipe c, so that the bulb is always filled either with the insecticide or deodorizing substance or a quantity of the same mixed with fluid from the pipe, so that subsequent compression of the bulb will again act to force the contents thereof into the pipe c to mingle with the fluid therein and be discharged from the nozzle.

To assist in the refilling of the reservoir when the pressure is relaxed, I have, as shown in Fig. 1, formed the perforations in the pipe c by a punching process, leaving lips $c^2$, $c^3$ turned inwardly, as shown, the lip $c^2$ being inclined in the direction against the flow of fluid in the conducting pipe, while the lip $c^3$ is in the same direction as the flow of fluid in said pipe, so that when the bulb is relaxed, the lip $c^2$ catches a portion of the water flowing through the pipe and directs it into and to fill the bulb, the latter when compressed expelling its contents principally through the forward opening or perforation adjacent the lip $c^3$, the result of this construction being that when the water from the pipe is admitted to fill the bulb it enters at the rear end of the bulb and circulates through the latter thoroughly mixing in the inside the deodorizing substance therein before it can issue again into the conducting pipe.

In Fig. 2, I have shown a slightly modified form of apparatus which, however, embodies the same invention as the apparatus Fig. 1.

Referring to Fig. 2, the insecticide or deodorizing substance or fluid is placed in an independent reservoir $m$ connected with the pipe c by means of a flexible connection or tube $m'$, the external pressure to force the contents of the reservoir into the pipe, being applied by compressing the bulb $m^2$ connected with the reservoir.

As my improved apparatus is to be applied to the ordinary garden hose or to a force pump hose, it will be evident that the spray may be thrown upon the highest shrubs or trees to thus reach all parts of the same, thus making my apparatus an extremely useful and serviceable one.

This invention is not restricted to the particular construction or form of apparatus herein shown in the drawings, and selected as a means of illustrating this invention, for the same may be varied in many particulars and still come within the scope of the invention.

I claim—

1. An apparatus for applying insecticide and similar substances containing the following instrumentalities, viz:—a fluid conducting pipe; an insecticide containing reservoir connected therewith and provided with a filling opening through which to replenish said receptacle when it becomes exhausted, and a closure for said opening, the pressure of fluid in said pipe normally holding back and preventing the escape of the contents of the receptacle therefrom into said pipe, and manually operated means to force the contents of said reservoir into said pipe against the pressure of and to mingle with the fluid flowing therein, substantially as described.

2. The combination with a fluid conducting pipe, of an insecticide containing compressible bulb connected therewith and provided with a filling opening, and a closure therefor, compression of said bulb ejecting the contents thereof into said pipe against the pressure of and to mingle with the fluid flowing therein, substantially as described.

3. The combination with a fluid conducting pipe, of an insecticide containing compressible bulb surrounding said pipe and communicating therewith through perforations in said pipe, a filling opening in said bulb, and a closure therefor, compression of the bulb ejecting the contents thereof into said pipe against the pressure of and to mingle with the fluid flowing therein, substantially as described.

4. The combination with a fluid-conducting pipe c, and the threaded heads at its opposite ends, of a compressible receiving bulb $d$ surrounding said pipe and at its ends fitting tightly about the necks of said heads, and perforations $c'$ in the said tube within said bulb, the lips $c^2$, $c^3$, and the inlet $d^2$ and its cap, all substantially as described.

5. The combination with a perforated pipe c, and the heads at opposite ends thereof, one of which is provided with a valve, of a compressible receiving bulb surrounding the said pipe, and an inlet for said bulb, substantially as described.

In testimony whereof I have signed my name to this specification in the presence of two subscribing witnesses.

GABRIEL BOAS.

Witnesses:
    FREDERICK L. EMERY,
    JOHN C. EDWARDS.